(12) United States Patent
Haynie et al.

(10) Patent No.: US 7,760,736 B2
(45) Date of Patent: *Jul. 20, 2010

(54) METHOD, SYSTEM, AND COMPUTER PROGRAM PRODUCT FOR ETHERNET VIRTUALIZATION USING AN ELASTIC FIFO MEMORY TO FACILITATE FLOW OF BROADCAST TRAFFIC TO VIRTUAL HOSTS

(75) Inventors: Howard M. Haynie, Wappingers Falls, NY (US); Jeffrey C. Hanscom, Poughkeepsie, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/036,831

(22) Filed: Feb. 25, 2008

(65) Prior Publication Data

US 2009/0213857 A1 Aug. 27, 2009

(51) Int. Cl.
*H04L 12/28* (2006.01)
*G06F 11/00* (2006.01)
(52) U.S. Cl. .................. 370/392; 370/248; 370/401; 709/238; 711/203
(58) Field of Classification Search ......... 370/394–422, 370/230–392; 711/4, 114, 203; 709/220, 709/238
See application file for complete search history.

(56) References Cited

U.S. PATENT DOCUMENTS 7,586,936 B2    9/2009    Arimilli et al.

2002/0112113 A1    8/2002    Karpoff et al.

(Continued)

OTHER PUBLICATIONS

Z/Architecture Principles of Operation, International Business Machines Corporation, SA22-7832-05, Sixth Edition (Apr. 2007).

*Primary Examiner*—Afsar M. Qureshi
(74) *Attorney, Agent, or Firm*—Cantor Colburn LLP; Steven Chiu

(57) ABSTRACT

A packet that represents unknown traffic for a virtual host is received. A test is performed to ascertain whether or not a destination connection can be determined for the received packet wherein it is discovered the packet is a broadcast (or multicast) packet. Since such packets have multiple destinations in a virtualized environment, the broadcast (or multicast) packet requires special handling and is passed to a store engine. The store engine obtains a free packet buffer from an elastic FIFO memory, moves the packet into the free packet buffer, and submits the free packet buffer back to the elastic FIFO memory. An assist engine determines and assigns connections to packets submitted to the elastic FIFO without known connections, such as broadcast (or multicast) packets. The assist engine efficiently performs this task through the use of indirect buffers, which are also obtained from and submitted back to the elastic FIFO. A monitoring engine detects both an availability of connection-specific resources and a presence of one or more waiting packets, within the elastic FIFO, with a known destination connection. When both are detected, said monitoring engine removes a packet from the elastic FIFO and passes it to an allocating engine. The allocating engine allocates the one or more connection-specific resources required to send the packet to the virtual host memory corresponding to the connection destination, then passes the packet to a sending engine which writes the packet to the virtual host memory.

14 Claims, 6 Drawing Sheets

U.S. PATENT DOCUMENTS

| | | |
|---|---|---|
| 2003/0051048 A1 | 3/2003 | Watson et al. |
| 2004/0117438 A1 | 6/2004 | Considine et al. |
| 2004/0133634 A1 | 7/2004 | Luke et al. |
| 2005/0125593 A1 | 6/2005 | Karpoff et al. |
| 2009/0168681 A1* | 7/2009 | Moon ........................ 370/312 |
| 2009/0213857 A1 | 8/2009 | Haynie et al. |
| 2009/0225665 A1* | 9/2009 | Haynie et al. ................ 370/248 |

* cited by examiner

METHOD, SYSTEM, AND COMPUTER PROGRAM PRODUCT FOR ETHERNET VIRTUALIZATION USING AN ELASTIC FIFO MEMORY TO FACILITATE FLOW OF BROADCAST TRAFFIC TO VIRTUAL HOSTS

BACKGROUND OF THE INVENTION

This invention relates generally to network virtualization and, more particularly, to methods, systems, computer program products, and hardware products for implementing Ethernet virtualization routers using an elastic FIFO memory to facilitate flow of broadcast traffic to virtual hosts.

A shortcoming with existing network virtualization techniques is that routers which service a relatively large number of communication channels are oftentimes not able to achieve the necessary bandwidth to keep packets moving. As congestion builds, the router may place back pressure on a network to avoid accepting additional packets, or packets may be dropped altogether. Moreover, a shortage in channel-specific resources for one or two channels may cause packet throughput in other channels to suffer as well. Accordingly, it would be advantageous to provide an enhanced technique for Ethernet virtualization that overcomes the foregoing deficiencies and that is capable of expeditiously moving packets to a desired destination connection.

BRIEF SUMMARY OF THE INVENTION

Exemplary embodiments include a method for Ethernet virtualization using an elastic FIFO memory to facilitate flow of unknown traffic to virtual hosts. The method comprises receiving a packet that represents unknown traffic on a network, the packet including a header; examining a the packet header to ascertain that the packet is a broadcast packet; passing the packet to a store engine; the store engine obtaining a free packet buffer from an elastic first-in, first-out (FIFO) memory, wherein the free packet buffer is an empty packet-sized block of memory in a local data store; the store engine moving the packet into the free packet buffer and submitting the packet buffer to the elastic FIFO memory; an assist engine finding the packet buffer on the named queue of broadcast packets and then determining a connection to the packet and moving the packet from the named queue to the numbered connection queue for that connection; a local engine performing a monitoring procedure to detect both an availability of connection-specific resources and a presence of one or more waiting packets with a known destination connection; when (a) a destination connection with one or more waiting packets, and (b) available connection-specific resources, are both detected, removing the packet from the local data store; an allocator allocating the one or more connection-specific resources required to send the packet to the virtual host memory corresponding to the connection destination; and a send engine writing the packet to the virtual host memory.

A system, and a computer program product corresponding to the above-summarized method is also described and claimed herein. Other systems, methods, and computer program products, according to embodiments will be or become apparent to one with skill in the art upon review of the following drawings and detailed description. It is intended that all such additional systems, methods, and computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

The detailed description explains the preferred embodiments of the invention, together with advantages and features, by way of example with reference to the drawings.

DETAILED DESCRIPTION OF EXEMPLARY EMBODIMENTS

An exemplary embodiment of the present invention permits a hardware Ethernet virtualization router which serves a large number of communications channels to maintain high bandwidth by ensuring that packets can continue moving. The router avoids having to put back pressure on the network or having to drop packets, which are undesirable alternatives to moving packets. Thus, the technical effects and benefits include allowing an Ethernet virtualization router servicing any number of communications channels to continually move traffic efficiently regardless of packet types or shortages in channel-specific resources. High bandwidth can be maintained in spite of the unpredictable and bursty traffic patterns inherent to Ethernet networks. Packet order is maintained on a host-by-host basis and does not stall the flow of packets to one virtual machine because of a shortage of resources required for another virtual machine. Packets requiring special attention, such as broadcast packets, packets for which connections cannot be determined by a parser, or address resolution protocol (ARP) packets, may also be handled using the methods disclosed herein.

Figure 1A:
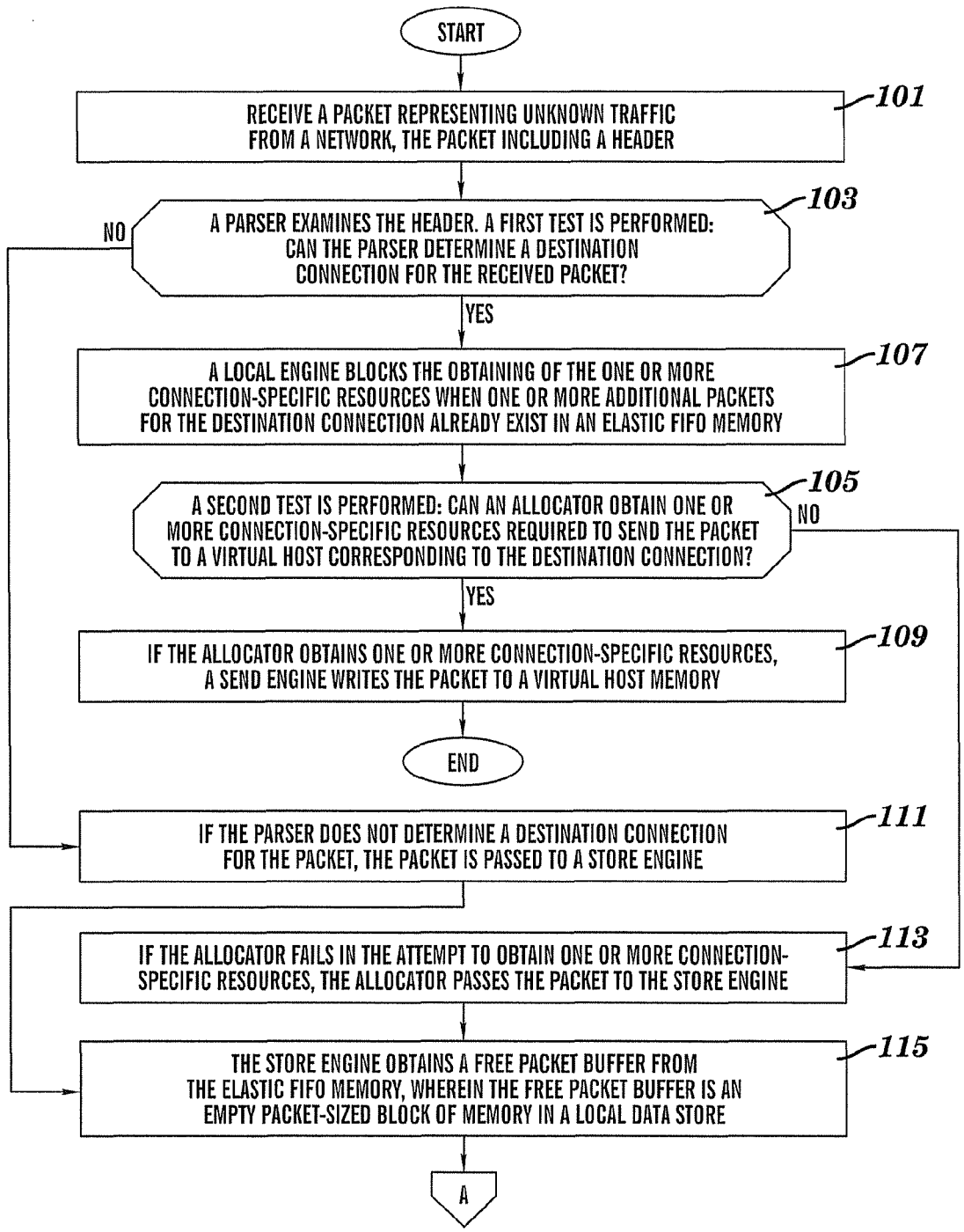
FIGS. 1A and 1B together comprise a flowchart setting forth an illustrative operational sequence for Ethernet virtualization using an elastic FIFO memory to facilitate flow of unknown traffic to a virtual host.
Figure 1B:
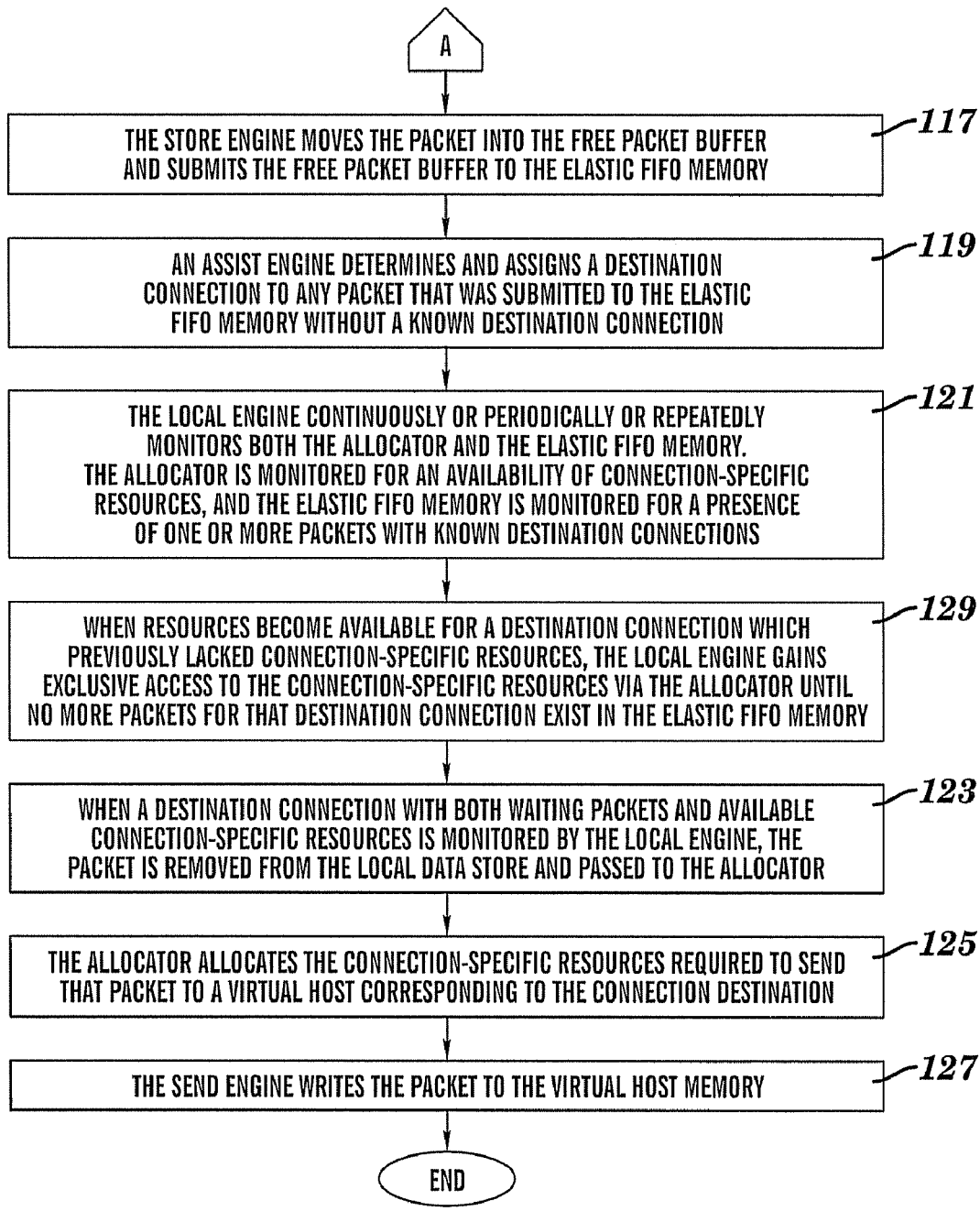
Figure 2:
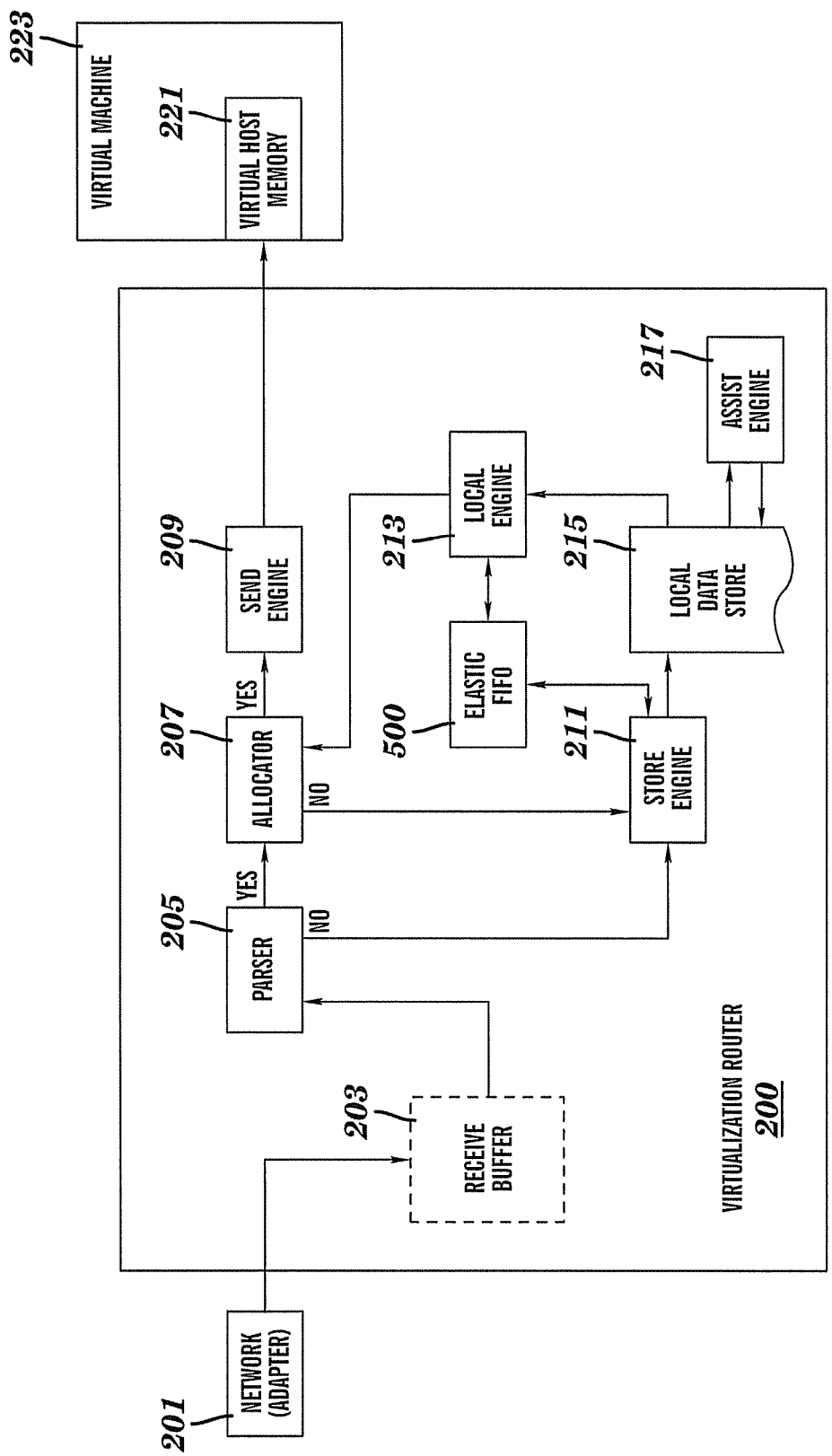
FIG. 2 is a block diagram setting forth an illustrative system for Ethernet virtualization using an elastic FIFO memory to facilitate flow of unknown traffic to a virtual host.

FIGS. 1A and 1B together comprise a flowchart setting forth an illustrative operational sequence for Ethernet virtualization using an elastic FIFO memory to facilitate flow of unknown traffic to a virtual host, and FIG. 2 is a block diagram setting forth an illustrative system for Ethernet virtualization using an elastic FIFO memory to facilitate flow of unknown traffic to a virtual host. Although FIGS. 1A and 1B show a linearly sequential series of operations, this is solely for purposes of clarity and illustration, as some of the steps could be performed in parallel or in a sequence other than what is shown in FIGS. 1A and 1B. The operational sequence of FIGS. 1A and 1B commences at block 101 (FIG. 1A) where a packet is received that represents unknown traffic destined for a virtual host. The packet is received from a network. The received packet includes a header. Illustratively, the received packet may be written into a relatively small optional receive buffer 203 (FIG. 2) as the packet arrives from a network adapter 201. The receive buffer 203 is not strictly required.

At block 103 (FIG. 1A), a parser 205 (FIG. 2) examines each packet's headers (for example, layer 2, layer 3, etc.) and a first test is performed to ascertain whether or not a destination connection can be determined for the received packet. The affirmative branch from block 103 leads to block 107, and the negative branch from block 103 leads to block 111 (described in greater detail hereinafter). If the parser 205 (FIG. 2) can determine a destination connection for the packet, following block 107 at block 105 (FIG. 1A), a second test is performed to ascertain whether or not one or more connection-specific resources required to send the packet to a virtual host memory corresponding to the destination connection are available. The one or more connection-specific resources are available if they can be obtained for allocation by a resource allocation mechanism such as an allocator 207 (FIG. 2). For example, the allocator 207 attempts to obtain one or more connection-specific resources required to send that packet to a virtual machine 223 that corresponds to the destination connection. Note that the terms "virtual machine" and "virtual host" are used interchangeably herein. The affirmative branch from block 105 leads to block 109 (to be described in greater detail hereinafter), whereas the negative branch from block 105 leads to block 113 (to be described in greater detail hereinafter).

Although the illustrative configuration of FIG. 2 shows one virtual machine 223, this is for purposes of clarity, as the system of FIG. 2 may contain a plurality of virtual machines. For example, a practical system may include hundreds or thousands of virtual machines. With hundreds or thousands of virtual machines running on a single physical host, there may be scattered shortages of resources for some small subset of the virtual machines at any given time. Within the physical machine, a hypervisor may allocate differing resources to different virtual machines. For example, some virtual machines may have higher priority and therefore get more time-slices than others. Or, some virtual machines may have more physical storage allocated for use as receive buffers. A real-world system hosting thousands of virtual machines may not operate perfectly at all times with regard to resource management. Likewise, scattered resource shortages may be attributed to the inherently bursty nature of Ethernet traffic.

At block 107 (FIG. 1A), a local engine 213 (FIG. 2) blocks the allocator 207 from allocating resources to new packets when packets for the same connection already exist within an elastic first-in, first-out (FIFO) 500 memory because of a previous lack of resources. At block 109 (FIG. 1A), if the allocator 207 is successful in obtaining the resources, a send engine 209 (FIG. 2) writes the packet to a virtual host memory 221 associated with the virtual machine 223. If the parser 205 does not determine the packet's connection (FIG. 1A, block 111), it passes the packet to a store engine 211 (FIG. 2). At block 113 (FIG. 1A), if the allocator 207 (FIG. 2) fails in its attempt to obtain the required resources (which could be because the resources are not available or because the local engine currently has priority access to those resources), the allocator 207 passes the packet to the store engine 211.

Next, at block 115 (FIG. 1A), for each packet it is to service, the store engine 211 (FIG. 2) obtains a free packet buffer from the elastic FIFO 500. A free packet buffer is an empty packet-sized block of memory in a local data store 215. The store engine 211 moves the packet into that buffer (FIG. 1B, block 117) and submits the used buffer to the elastic FIFO 500 (FIG. 2). If a free packet buffer resource is not available, the packet is dropped or, optionally, the store engine 211 can wait for that shared resource to become available provided sufficient buffering, such as the receive buffer, is available. Since a packet's connection must be determined before it can be sent to the virtual host memory 221, at block 119 (FIG. 1B) an assist engine 217 (FIG. 2) determines and assigns connections to packets that were submitted to the elastic FIFO 500 without known connections (i.e. those packets which arrived from the parser 205).

The procedure of FIGS. 1A and 1B progresses to block 121 (FIG. 1B) where the local engine 213 (FIG. 2) continuously or periodically or repeatedly monitors both the allocator 207 for connection-specific resources and the elastic FIFO 500 for the presence of packets with known destination connections. When resources become available for a connection which had previously lacked resources, block 129, the local engine 213 (FIG. 2) gains exclusive access to those resources, via the allocator 207, until no more packets for that connection exist in the elastic FIFO 500. The operations of block 129 (FIG. 1B) are critical to maintaining packet order within destination connections. At block 123 (FIG. 1B), when a connection with both waiting packets and available resources is seen, the packet is removed from the local data store 215 (FIG. 2) and passed to the allocator 207. The allocator 207 allocates the connection-specific resources required to send that packet to a virtual machine 223 corresponding to the connection destination (FIG. 1B, block 125). Since the local engine 213 (FIG. 2) already determined that the resources were available and claimed them for the packet, the allocator 207 is successful and the packet is written to virtual host memory 221 by the send engine 209 at block 127 (FIG. 1B).

The parser 205 (FIG. 2), allocator 207, send engine 209, store engine 211, local engine 213, local data store 215, elastic FIFO 500, and assist engine 217 together comprise a virtualization router 200. The router 200 is referred to as a virtualization router because it supports communication channels to a plurality of virtual machines which are called destination connections, such as virtual machine 223, providing the illusion to each virtual machine 223 that it possesses its own network interface card (such as the network adapter 201), when in fact only a single high-speed adapter (i.e., the network adapter 201) is present. The network adapter 201 is run in promiscuous mode to receive all packets off the network. The router 200 determines the correct connection for each packet and moves the packet to a memory space (i.e., virtual host memory 221) of a corresponding virtual machine 223.

Inbound Ethernet traffic flow is inherently bursty. Multiple shared and non-shared resources are required for each connection in order to move its packets. With inherently limited resources which must be carefully managed, one of the functions performed by the router 200 is to handle the bursty traffic in such a way as to minimize packet loss and retransmission for each connection in the context of virtual hosts, thereby maximizing network efficiency.

Figure 3:
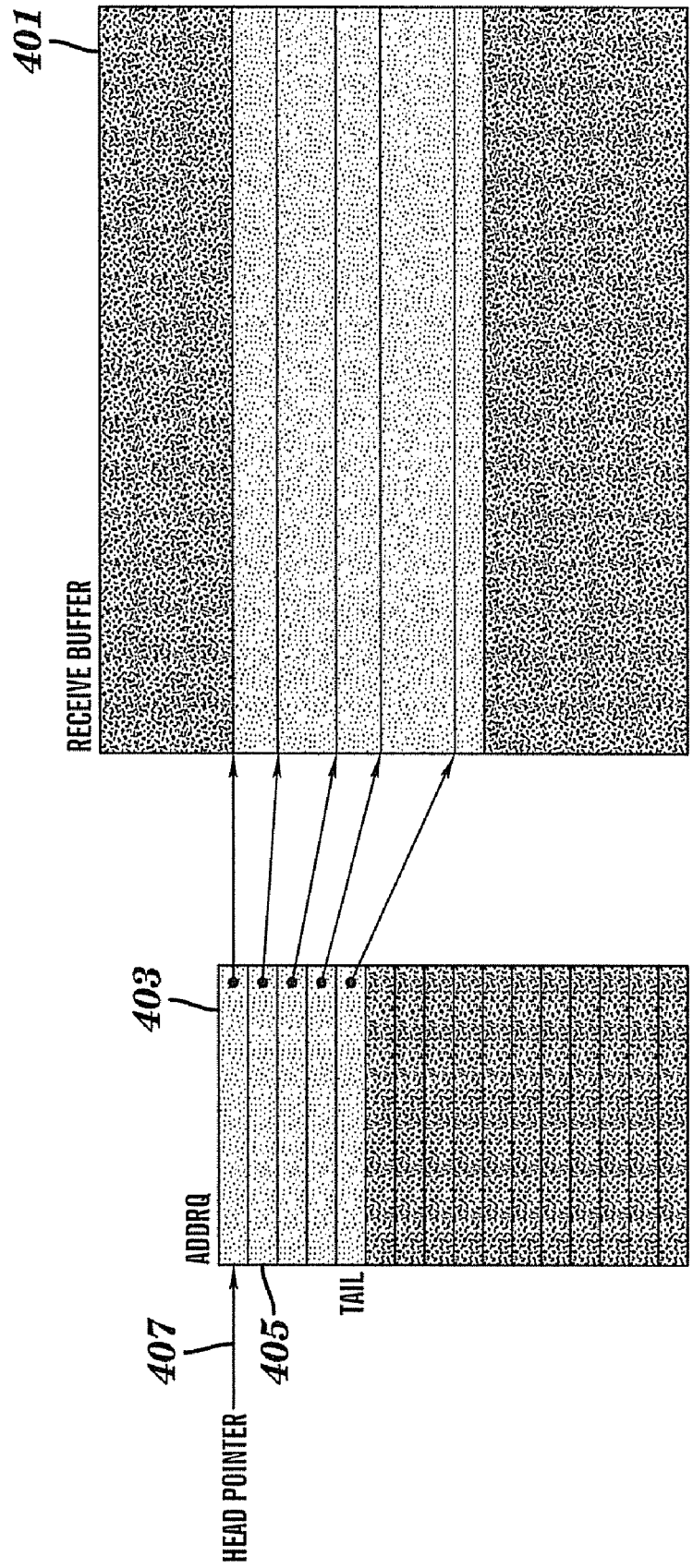
FIG. 3 is a data structure diagram setting forth an illustrative receive buffer for use with the system of FIG. 2.

FIG. 3 is a data structure diagram setting forth an illustrative receive buffer 401 for implementing the optional receive buffer 203 of FIG. 2. Incoming bursts of packet data are initially written directly into the receive buffer 401 (FIG. 3), which is managed with a queue of records called an addrq 403. Each record 405 contains various information about a burst including a pointer into the receive buffer 401 where the data was written. All packets are removed from the receive buffer 401 in the same order that they were previously written (as the packets arrived from the network adapter 201, FIG. 2). If the packet at the head of the addrq 403 (FIG. 3) as indicated by a head pointer 407 is not a type of packet that requires special handling and if all required resources are available to move the packet, the packet is sent directly to its connection destination (virtual host memory 221, FIG. 2). Otherwise, if the packet is a special type or if one or more of the resources is not available, the packet is sent to the elastic FIFO 500.

As the head pointer 407 (FIG. 3) moves forward (i.e., in a downward direction wherein FIG. 3 is oriented such that the reference numerals are upright), packets for connections with ample resources continue to be sent directly to their connection destinations even while packets for other connections without resources are sent to the elastic FIFO 500 (FIG. 2). Similarly, by the same mechanism, packets that do not require special consideration can be sent directly to their destinations while packets that require extra processing (e.g. broadcast packets) can be sent to the elastic FIFO 500 to be serviced by an independently-running assist engine. In this way, the flow of all packets continues through the router 200 consistently without stalls or hesitations.

Figure 4:
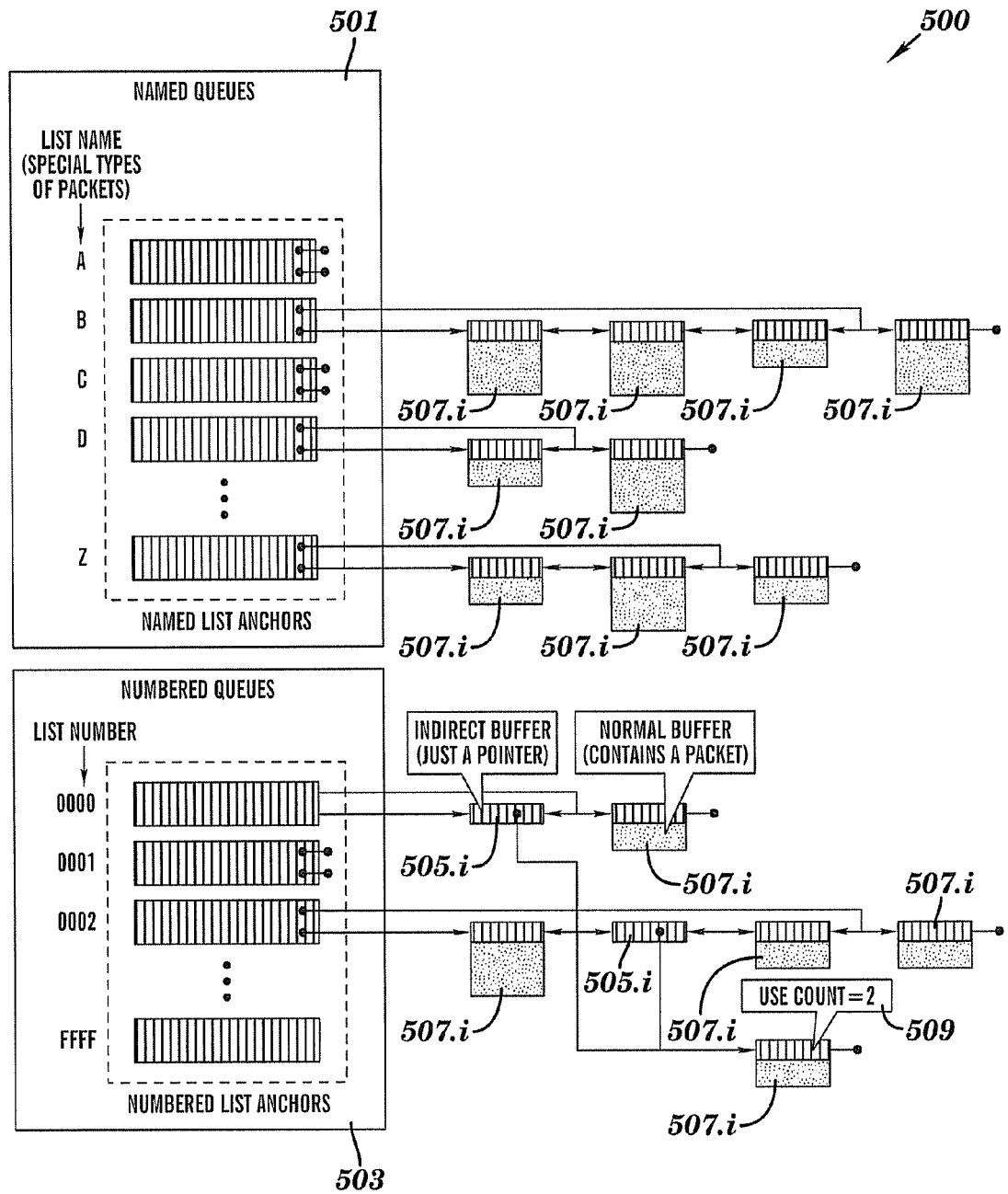
FIG. 4 is a data structure diagram setting forth an illustrative elastic FIFO for use with the system of FIG. 2.

FIG. 4 is a data structure diagram setting forth an illustrative elastic FIFO 500 memory (FIGS. 2 and 4) for use with the system of FIG. 2 and the method of FIG. 1. The elastic FIFO 500 (FIG. 4) includes a large array of linked lists of packet buffers, as well as all the functionality required to maintain those lists and allow them to be put to a useful purpose. The elastic FIFO 500 serves to manage the flow of packets that can not be sent directly from the receive buffer 203 (FIG. 2) to one of the virtual machines such as the virtual machine 223. The elastic FIFO 500 (FIG. 4) is called "elastic" because it changes shape with changes in either or both of: (a) the number of active connections, or (b) the total number of packets contained by the FIFO. In its entirety, the memory footprint of the elastic FIFO 500 can be increased or decreased over time as free buffers are dynamically added or removed.

The elastic FIFO 500 is also called "elastic" because it is actually a collection of queues on which packet buffers and pointers to packet buffers are held. These pointers to packet buffers are shown in FIG. 4 as indirect buffers 505.$i$, where i is any positive integer greater than zero. The packet buffers are shown in FIG. 4 as normal buffers 507.$j$ where j is any positive integer greater than zero. There are named queues 501 for free normal buffers 507.$j$ of various sizes. These named queues 501 also include a named queue for free indirect buffers 505.$i$. Indirect buffers 505.$i$ only occupy a small amount of memory, as they merely point to a normal buffer 507.$j$, but these indirect buffers 505.$i$ do occupy some memory and are thus obtained as needed from the free list so that they may be enqueued to a numbered list. Since the elastic FIFO 500 is elastic, additional free indirect buffers 505.$i$ can be added as necessary, and these buffers may also be taken away if the free list becomes excessively long. There is no direct relationship between the total number of indirect buffers 505.$i$ and normal buffers 507.$j$. At any given time, some number of the normal buffers 507.$j$ will be occupied by packets, though ideally most should be free most of the time.

There are two categories of queues within the elastic FIFO 500: named queues 501 and numbered queues 503. When a packet is sent to the elastic FIFO 500 because it requires special consideration, it is placed on a named queue of named queues 501, as opposed to being placed on a numbered connection queue of numbered queues 503. Each named queue of named queues 501 includes a list name A, B, C, D, Z that reflects a special packet type placed on that queue. Packets placed on named queues 501 must ultimately be moved to numbered queues 503. Packets on a numbered queue of numbered queues 503 can be sent to a corresponding destination connection's virtual host memory 221 (FIG. 2) as soon as the required connection-specific resources are available.

Named queues 501 (FIG. 4) are also used for implementing pools of various types of free buffers, which are buffers that are not currently associated with a packet. A free buffer is obtained for each packet that is to be locally stored, and that buffer is returned to the pool from which it originated once the packet has been removed from local storage and sent to virtual host memory 221 (FIG. 2). When the special packet type is broadcast (or multicast) the packet must be moved from a "broadcast" (or "multicast") named queue of named queues 501 (FIG. 4) to a plurality of numbered queues in numbered queues 503 so it may be sent to multiple virtual machines including virtual machine 223 (FIG. 2), wherein potentially thousands of such virtual machines are present. The assist engine 217 efficiently performs this task through the use of indirect buffers 505.$i$ (FIG. 4).

There are two types of packet buffers that may be put on a numbered queue of numbered queues 503: normal buffers 507.$j$ and indirect buffers 505.$i$. Indirect buffers 505.$i$ do not contain data themselves, but merely point to a normal buffer 507.$j$. The assist engine 217 (FIG. 2) removes a normal buffer 507.$j$ (FIG. 4) from a named queue of named queues 501, obtains multiple free indirect buffers 505.$i$ from the elastic FIFO 500, points those indirect buffers 505.$i$ at the normal buffer 507.$j$, and enqueues those indirect buffers 505.$i$ to the appropriate numbered queues 503.

Every normal buffer 507.$j$ carries a use count 509. A use count 509 for a normal buffer 507.$j$ is usually 1, but can be higher when the normal buffer 507.$j$ is the target of an indirect buffer 505.$i$. A normal buffer 507.$j$ that is directly sitting on a queue has a use count of 1, while a normal buffer 507.$j$ pointed to by one or more indirect buffers 505.$i$ (which are sitting on one or more queues) has a use count equal to the number of indirect buffers 505.$i$ pointing to it. A normal buffer 507.$j$ that is the target of an indirect buffer 505.$i$, can not itself directly exist on any queue. Each time a copy of the packet in the normal buffer 507.$j$ is sent to virtual host memory 221 (FIG. 2), an indirect buffer 505.$i$ (FIG. 4) pointing to it is removed from a numbered queue of numbered queues 503 and the normal buffer's use count 509 is decremented by 1, (provided it is still greater than 1). When the normal buffer's use count 509 reaches 1, it is returned to the pool of free normal buffers 507.$j$ at the same time a final indirect buffer 505.$i$ pointing to the normal buffer 507.$j$ is dequeued and returned to the pool of free indirect buffers 505.$i$.

The local engine 213 (FIG. 2) performs the task of dequeuing buffers from the numbered queues 503 (FIG. 4), via the interface provided by the elastic FIFO 500, so the packets contained within or pointed to by those buffers can be sent to virtual host memory 221 (FIG. 2). As soon as the allocator 207 fails to obtain virtual host memory 221 for one packet for a given connection, it must send all subsequent packets for that connection to the local data store 215 in order to maintain packet order for that connection. One task performed by the local engine 213 is to empty queues containing packets that have accumulated, due to resource shortages, so packets may once again flow directly from the network adapter 201 to virtual host memory 221, i.e. without being stored first. The local engine 213 obtains exclusive access to connection-specific resources until the local engine determines that it has emptied a destination connection's queue and relinquishes that exclusivity.

Figure 5:
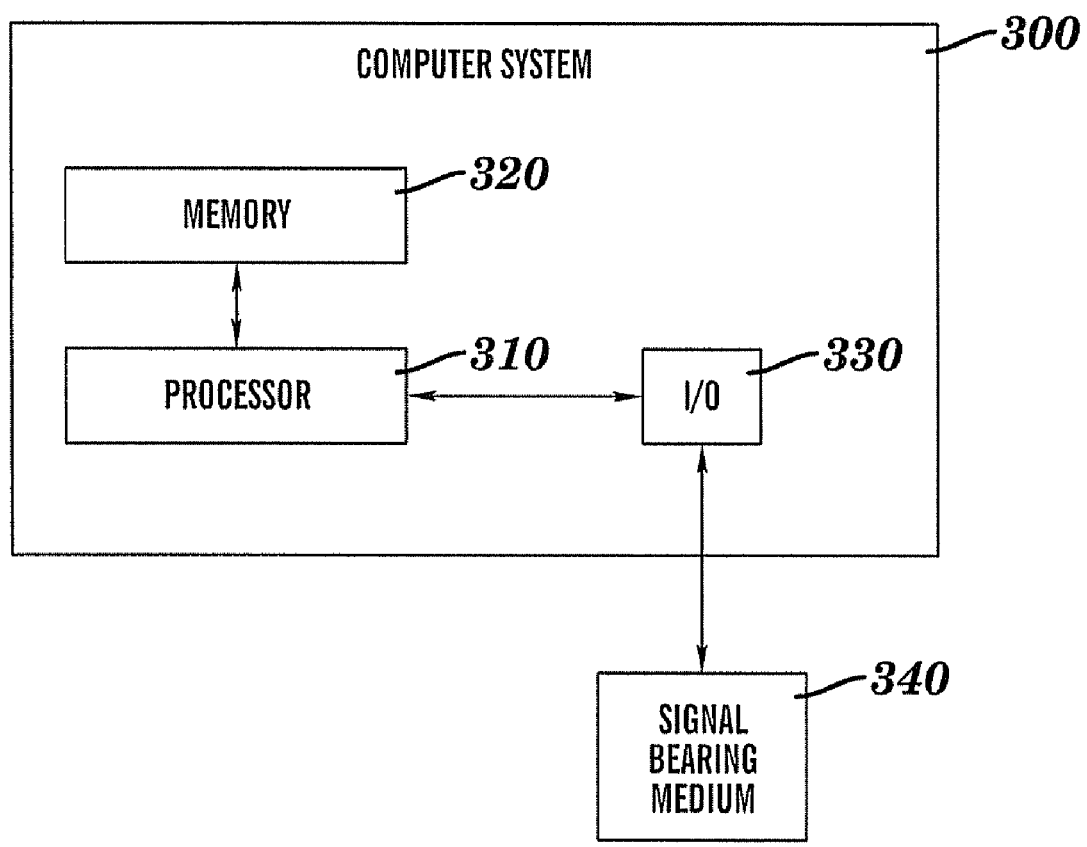
FIG. 5 is a block diagram setting forth an illustrative computer program product for Ethernet virtualization using an elastic FIFO memory to facilitate flow of unknown traffic to a virtual host.

FIG. 5 is a block diagram setting forth an illustrative computer program product for Ethernet virtualization using an elastic FIFO memory to facilitate flow of unknown traffic to a virtual host. The system includes a computer 300 operatively coupled to a signal bearing medium 340 via an input/output interface (I/O) 330. The signal bearing medium 340 may include a representation of instructions for Ethernet virtualization using an elastic FIFO memory to facilitate flow of unknown traffic to a virtual host, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for Ethernet virtualization using an elastic FIFO memory to facilitate flow of unknown traffic to a virtual host, wherein the information is represented, e.g., on the signal bearing medium 340 and communicated to the computer 300 via the I/O 330, wherein the processor 310 saves information as appropriate into a memory 320. Illustratively, the processor 310 corresponds to the processing mechanism 106 of FIG. 1. Returning now to FIG. 6, this information may also be saved into the memory 320, e.g., via communication with the I/O 330 and the signal bearing medium 340.

The processor 310 executes a program for implementing Ethernet virtualization using an elastic FIFO memory to facilitate flow of unknown traffic to a virtual host. The processor 310 implements instructions for receiving a packet that represents unknown traffic destined for a virtual host on a network; performing a first test to ascertain whether or not a destination connection can be determined for the received packet wherein, if a destination connection can be determined, a second test is performed to ascertain whether or not one or more connection-specific resources required to send the packet to a virtual host memory corresponding to the destination connection are available; if a destination connection for the packet cannot be determined, passing the packet to a store engine; if the one or more connection-specific resources are not available, passing the packet to the store engine; the store engine obtaining a free packet buffer from an elastic first-in, first-out (FIFO) memory, wherein the free packet buffer is an empty packet-sized block of memory in a local data store; the store engine moving the packet into the free packet buffer and submitting the free packet buffer to the elastic FIFO memory; performing a monitoring procedure to detect both an availability of connection-specific resources and a presence of one or more waiting packets with a known destination connection; when a destination connection with: (i) one or more waiting packets, and (ii) available connection-specific resources; are both detected, removing the packet from the local data store; allocating the one or more connection-specific resources required to send the packet to the virtual host memory corresponding to the connection destination; and writing the packet to the virtual host memory. The foregoing steps may be implemented as a program or sequence of instructions within the memory 320, or on a signal bearing medium, such as the medium 340, and executed by the processor 310.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

We claim:

1. A method for Ethernet virtualization using an elastic FIFO memory to facilitate flow of broadcast traffic to a virtual host, the method comprising:

receiving a packet that represents unknown traffic on a network, the packet including a header;

examining the packet header to ascertain that the packet is a broadcast packet;

passing the packet to a store engine;

the store engine obtaining a packet buffer from an elastic first-in, first-out (FIFO) memory, wherein the packet buffer is an empty packet-sized block of memory in a local data store;

the store engine moving the packet into the packet buffer and submitting the packet buffer to the elastic FIFO memory;

an assist engine finding the packet buffer on a named queue of broadcast packets and then determining a connection to the packet and moving the packet from the named queue to a numbered connection queue for that connection;

a local engine performing a monitoring procedure to detect both an availability of connection-specific resources and a presence of one or more waiting packets with a known destination connection;

when a destination connection with one or more waiting packets and available connection-specific resources are both detected, removing the packet from the local data store;

allocating the one or more connection-specific resources required to send the packet to a virtual host memory corresponding to the destination connection; and writing the packet to the virtual host memory.

2. The method of claim 1 wherein the method further includes storing the received packet in a receive buffer.

3. The method of claim 1 wherein the one or more connection-specific resources are rendered as unavailable if one or more additional packets for the destination connection already exist in the elastic FIFO memory.

4. The method of claim 1 wherein the packet is written to a plurality of virtual hosts by using the elastic FIFO memory to ensure that one or more packets are sent to a virtual host of the plurality of virtual hosts when one or more resources of the virtual host become available.

5. A system for Ethernet virtualization using an elastic FIFO memory to facilitate flow of broadcast traffic to a virtual host, the system comprising:
   a parser configured to receive a packet representing unknown traffic on a network;
   an allocator configured to obtain one or more connection-specific resources required to send the packet to a virtual host memory corresponding to a destination connection for the packet;
   a store engine, operatively coupled to the parser, the store engine configured to receive one or more broadcast packets from the parser;
   an elastic first-in, first-out (FIFO) memory, operatively coupled to the store engine, the elastic FIFO memory configured to store a packet buffer, wherein the store engine obtains the packet buffer from the elastic FIFO memory, and wherein the packet buffer is an empty packet-sized block of memory in a local data store; the store engine moving the packet into the packet buffer and submitting the packet buffer to the elastic FIFO memory;
   a local engine configured to monitor both the allocator and the elastic FIFO memory; the allocator being monitored for an availability of connection-specific resources, and the elastic FIFO memory being monitored for a presence of one or more waiting packets with a known destination connection; wherein, when a destination connection with both one or more waiting packets and available connection-specific resources is monitored by the local engine, the packet is removed from the local data store and passed to the allocator; and wherein the allocator allocates the one or more connection-specific resources required to send the packet to a virtual host memory corresponding to the destination connection; and
   a send engine, operatively coupled to the allocator, the send engine configured to write the packet to the virtual host memory.

6. The system of claim 5 wherein the system further includes a receive buffer, operatively coupled to the parser, for storing the received packet.

7. The system of claim 5 wherein the one or more connection-specific resources are rendered as unavailable if one or more additional packets for the destination connection already exist in the elastic FIFO memory.

8. The system of claim 5 wherein the packet is written to the virtual host memory in response to one or more connection specific resources being obtained by the allocator.

9. The system of claim 5 wherein a destination connection is determined for and assigned to a broadcast packet that has been submitted to the elastic FIFO memory without a known destination connection.

10. The system of claim 5 wherein, when resources are obtained for a destination connection for which one or more connection-specific resources were previously unavailable, granting exclusive access to the local engine to obtain the one or more connection-specific resources for the destination connection.

11. The system of claim 10 wherein the local engine is further configured to terminate the exclusive access when no more packets for that destination connection exist in the elastic FIFO memory.

12. A computer program product for facilitating Ethernet virtualization using an elastic FIFO memory to facilitate flow of unknown traffic to a virtual host, the computer program product comprising:
   a tangible storage medium readable by a processing circuit and storing instructions for execution by the processing circuit for performing a method comprising:
   receiving a packet that represents unknown traffic on a network, the packet including a header;
   examining the packet header to ascertain that the packet is a broadcast packet and passing the packet to a store engine;
   the store engine obtaining a packet buffer from an elastic first-in, first-out (FIFO) memory, wherein the packet buffer is an empty packet-sized block of memory in a local data store;
   the store engine moving the packet into the packet buffer and submitting the packet buffer to the elastic FIFO memory;
   an assist engine finding the packet buffer on a named queue of broadcast packets and then determining a connection to the packet and moving the packet from the named queue to a numbered connection queue for that connection;
   a local engine performing a monitoring procedure to detect both an availability of connection-specific resources and a presence of one or more waiting packets with a known destination connection;
   when a destination connection with one or more waiting packets and available connection-specific resources are both detected, removing the packet from the local data store;
   allocating the one or more connection-specific resources required to send the packet to a virtual host memory corresponding to the destination connection; and
   writing the packet to the virtual host memory.

13. The computer program product of claim 12 wherein the method further includes storing the received packet in a receive buffer.

14. The computer program product of claim 12 wherein the one or more connection-specific resources are rendered as unavailable if one or more additional packets for the destination connection already exist in the elastic FIFO memory.

* * * * *